Dec. 7, 1937.  F. THORNTON, JR  2,101,110
HEATING UNIT
Filed July 1, 1932  2 Sheets-Sheet 1

WITNESSES:

INVENTOR
Frank Thornton, Jr.
BY
W. R. Coley
ATTORNEY

Dec. 7, 1937.   F. THORNTON, JR   2,101,110
HEATING UNIT
Filed July 1, 1932   2 Sheets-Sheet 2

WITNESSES:
E. A. McCloskey
H. M. Bielul

INVENTOR
Frank Thornton, Jr.
BY W. R. Coley
ATTORNEY

Patented Dec. 7, 1937

2,101,110

UNITED STATES PATENT OFFICE 2,101,110

HEATING UNIT

Frank Thornton, Jr., Pittsburgh, Pa., assignor to Westinghouse Electric & Manufacturing Company, East Pittsburgh, Pa., a corporation of Pennsylvania Application July 1, 1932, Serial No. 620,402

6 Claims. (Cl. 219—37)

This invention relates to electrical heating devices particularly of the kind used for cooking ranges.

More specifically my invention relates to a form of heating device in which the insulating material is a compound of magnesium and oxygen prepared as disclosed in the patent to Backer, Reissue 16,340 granted May 4, 1926.

It is an object of this invention to produce a heating unit of the class described in which the heat capacity shall be so small that the device will be heated to operating temperature within a few seconds after turning on the current.

It is a further object of my invention to produce a heating plate of the class described in which most of the parts are made of relatively thin metal, whereby only a small heat capacity will be introduced.

It is a further object of this invention to provide a heater of the class described in which loss of heat by radiation in non-useful directions shall be reduced.

It is a further object of this invention to manufacture such a heating plate by a process which shall afford abundant access of steam to the parts with which the steam must react during manufacture and which shall afford protection for said parts from atmospheric influences in the completed device.

In practicing my invention, I provide relatively thin plates of metal having troughs so located therein that when the plates are put together face to face they will cooperate to produce a hollow space. I locate a preferably helically wound resistor wire in the hollow space surrounded by and loosely filled with metallic magnesium. The two plates are then secured together at separated points so that high pressure steam can reach all parts of the resistor and magnesium in the hollow space, which treatment transforms the magnesium into magnesium hydroxide. The assembly is then subjected to heat to change the hydroxide to oxide and the two plates are then further secured together both within the edge as well as all around the edge.

Figure 1:
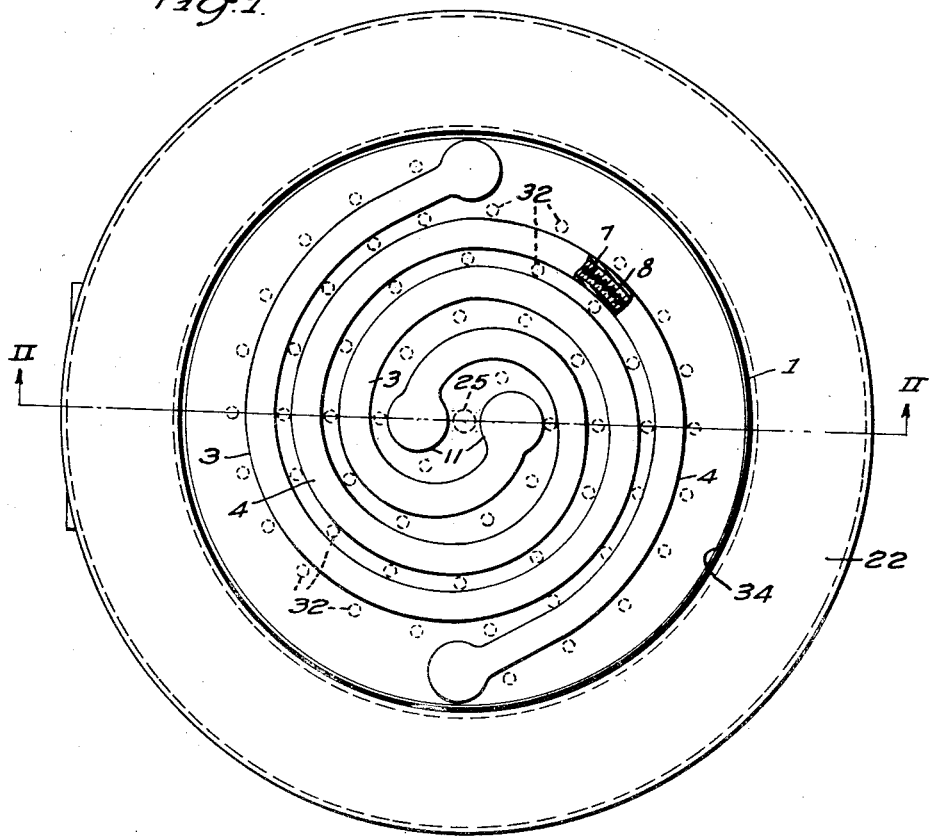
Figure 2:
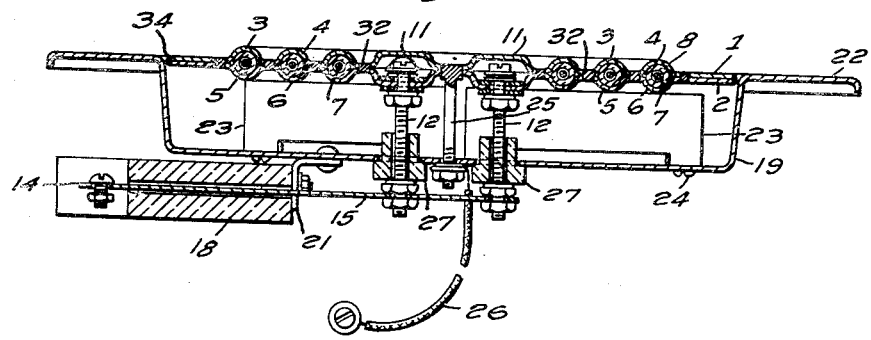
Figure 3:
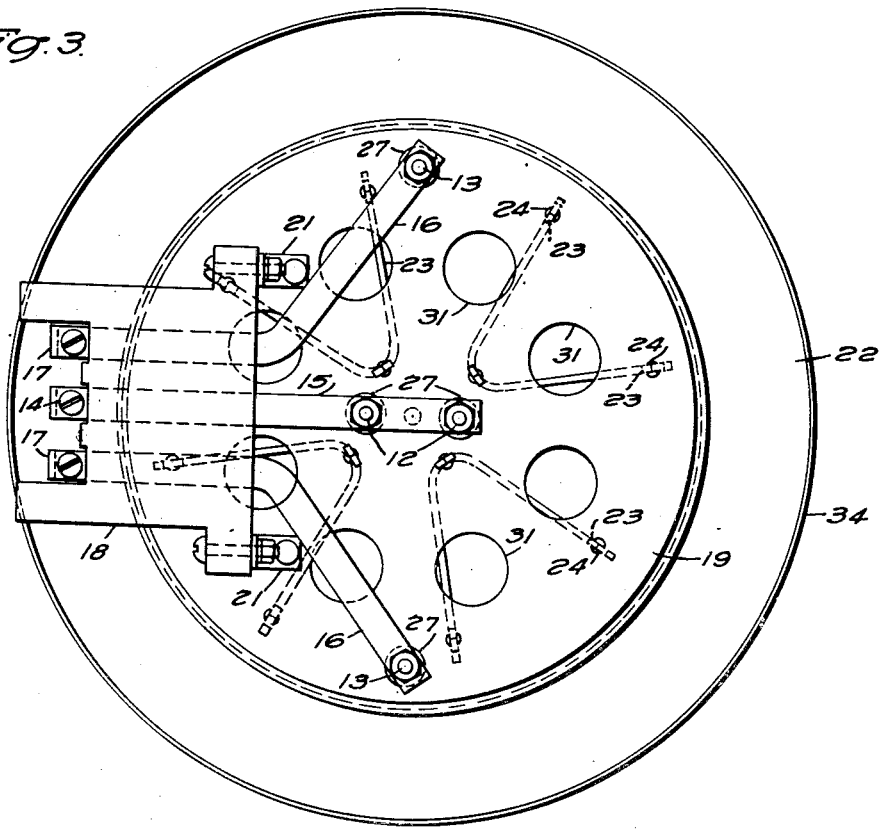
Figure 4:
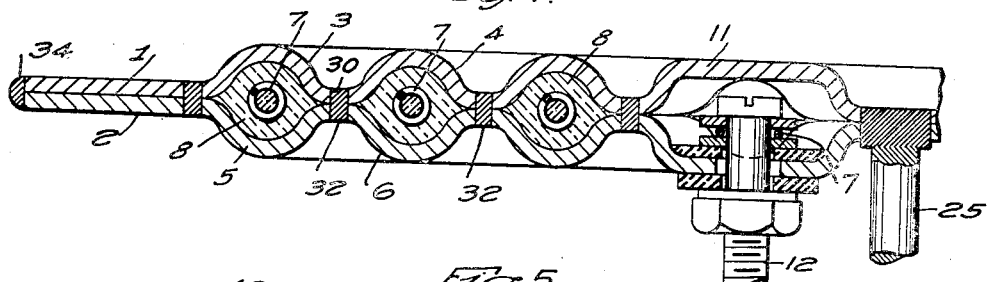
Figure 5:
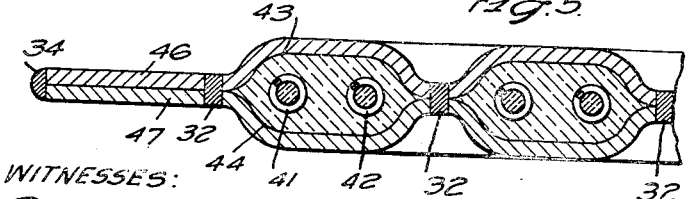

Other objects of my invention and details of the structure and of the method of manufacture will be understood from the following detailed description when considered in connection with the accompanying drawings, in which, Figure 1 is a top plan view of the heating device, Fig. 2 is a sectional view taken along the line II—II of Fig. 1, Fig. 3 is a bottom plan view, Fig. 4 is a section of a portion of the device upon an enlarged scale, and Fig. 5 is a section of a portion of a modified form of device embodying my invention.

I provide a metal plate 1 which cooperates with a similar plate 2 to form the body of the heater plate. A groove or trough 3 is produced in the plate 1, preferably by stamping if the plates are of sheet metal. Cast metal plates may however be used.

The trough may have the form of a plane curve. I use this expression here and in the claims to indicate any linear figure lying wholly in one plane including figures made partly or wholly of straight lines and also including figures composed of separated parts. Thus the double spiral composed of the trough 3 and the companion trough 4 is one form of plane curve which the trough may have. A plane curve is, however, only one form in which my invention may be embodied, as it may also be utilized in a curved heating element.

The plate 2 is provided with similar troughs 5 and 6 which are of the same form as the corresponding troughs 3 and 4 and register with them when the plates are placed face to face. Each trough in the plate 1 and the cooperating trough in the plate 2 form together a hollow space. Within this space is located a resistor wire 7, preferably in the form of a helix, the axis of which extends along the axis of the hollow space. The helix is surrounded without and partially filled within by electric-insulating material 8 which is preferably formed in place as will be explained below when describing the method of manufacture of the device. This material while electrically insulating is highly thermally conducting.

Enlargements 11 are located at the inner terminals of the troughs into which the ends of the respective wires 7 extend. A binding post 12 affords convenient connection to the end of each of the wires 7. At the outer end of each hollow space a similar enlargement is provided which accommodates a binding post 13 (see Fig. 3). The two binding posts 12 are connected together and to a terminal 14 by means of a strap 15. The two binding posts 13 are each connected by a strap 16 to terminals 17. The three terminals 14 and 17 are insulated by a block 18 of insulating material, such as porcelain, which is secured to the depressed central portion of a pan 19 by means of brackets 21.

The pan 19 forms the support for the plates 1 and 2. It is provided with a flange 22 on a higher level by means of which the device is secured in place on the cooking platform of a range. To afford a support for the plates 1 and 2 from the pan 19, supporting ribs 23, of V-shape, are fastened to the bottom of the pan in any convenient manner, for example, by split feet 24 which extend through the pan and are upset against the bottom surface thereof. The upper edges of the ribs 23 engage the lower surface of the troughs 5 and 6 at spaced small areas, practically points. The thermal connection between the ribs and the troughs is, therefore, almost ineffective to transmit heat.

The only other connection between the plates and the pan is through a central post 25 which is for convenience in attaching a grounding connection 26 to the plates. Insulating bushings 27 between each of the binding posts 12 and 13 and the pan 19 prevent any short circuit between the terminals of the resistance elements 7. The post 25 and the binding posts 12 and 13 mechanically prevent upward displacement of the plates 1 and 2 away from the ribs 23.

In the manufacture of the device, a helix of resistor wire is placed in each of the troughs 3 and 4 or the companion troughs 5 and 6. Through the interior of each helix one or more wires or ribbons of magnesium are threaded and around the exterior of each helix magnesium is placed either by winding magnesium ribbon about the helix or by stretching magnesium wire or ribbon along the outside of the helix. This assembly of resistor wire and magnesium may be placed in one trough or its companion trough or partly in one trough and partly in the companion trough. The ends of the resistor wire are secured to the binding posts 12 and 13.

Plates 1 and 2 are then placed together with the troughs in registry and extending in opposite directions from the contact surfaces of the plates. The troughs will thereby cooperate to form one or more closed hollow spaces but these spaces are not gas tight. There is enough clearance between the contacting faces of the plates to permit the passage of steam when under high temperature and pressure. The plates are then secured together by any convenient means as by spot welding at several separate places, preferably between one trough section and the next laterally adjacent trough section. For example, a spot weld might be located in the web 30 (see Fig. 4) between the outermost turn of the trough 3 and the adjacent turn of the trough 4. The number of these spot welds is not sufficient to completely cut off the flow of steam between the plates into the trough spaces, and thus all parts of the trough spaces are accessible to the steam without requiring the steam to travel along the hollow space to reach any particular portion thereof.

The assembly in this condition is placed in an autoclave and subjected to steam at high pressure, and consequently high temperature. I have found it advantageous to use a temperature as high as 1000° C. but the result can be accomplished with any temperature above 100° C. The steam acts upon the magnesium to produce magnesium hydroxide. This is a more bulky material than the metallic magnesium and the increase in volume acts to completely fill the hollow spaces. The expansion is sufficient to force the plates 1 and 2 apart except where they are held by the spot welding, but the separation is very slight and serves only to ensure that the steam has ample access to all parts of the tubular space.

After the magnesium has been completely transformed into magnesium hydroxide by the action of the steam, the device is removed from the autoclave and heated to remove water from the magnesium hydroxide, thereby converting it into magnesium oxide. The filling of magnesium oxide thus produced adheres firmly to the wire of the resistor element and also to the inner surfaces of the troughs forming the hollow spaces.

The heating is continued until all the water has been driven off which can be thus driven off. The apparatus is heated partly by treatment in an oven and partly by sending a current through the resistance element. When the drying is complete, the plates are forced together and fastened in this position by an additional number of spot welds between neighboring whorls of the spirals, or between laterally adjacent portions of whatever plane curve is used. These welds are shown at 32 in Figs. 1 and 4.

The edges of the plates are then welded together throughout the whole circumference as shown at 34 in Figs. 1 and 4. This may be done by electric welding or by gas welding in order to ensure that the magnesium oxide shall be completely protected from outside influences. When the heater plate has thus been prepared, it is assembled with the pan. No particular description of the method of this assembly is needed.

While Figs. 1 to 4 illustrate a heating element in which a single resistor helix and its electric-insulating material are located in a hollow space, my invention is not limited thereto. I have illustrated in Fig. 5 of the drawings, a modified form of heating unit in which two resistor helices 41 and 42 are located in each hollow space formed by cooperating troughs 43 and 44 in metal plates 46 and 47. The details of manufacture and the other details of construction may be the same as already described.

In the operation of the device, current is introduced through the terminals 14 and 17. The connections to these terminals are controlled by switches which form no part of my invention. These connections are such that the two resistor portions may be connected in series or in parallel or only one resistor element may be used.

The current heats the resistor element and the heat is conducted through the magnesium oxide and the walls of the parts of plates 1 and 2. Heat is also conducted along the web or flange comprising the flat portions of plates 1 and 2 between laterally adjacent portions of the hollow spaces.

Since the mass of metal to be heated is small, heat from the resistor element 7 quickly raises the whole plate to operating temperature. The device is, therefore, ready for use in cooking very soon after the current is turned on. I have found that a few seconds suffices to bring the heater plate to a red heat.

The action of the flanges or webs and of the flange constituting the outside margin of the heating plate tends to strengthen the plate against deformation. Consequently, when a cooking dish is placed on the heating plate the bottom of the dish will have intimate contact with practically every portion of the raised or projecting part of the plate and there will, therefore, be good heat conduction between the heating plate and the dish. If the dish in which the cooking is done is of aluminum or other bright metal it will not readily receive heat by radiation. It is, therefore, important that it make good contact with the heating plate in order that ample conduction of heat may occur.

If the dish be of material, for example the so-called graniteware, which receives heat readily by radiation, but does not conduct heat very well, the plates 1 and 2 will heat such a dish better than a heater consisting of an unconnected spiral because radiation from each whorl of the spiral, in the case of an unconnected tubular heater, will be in all directions and some, at least, of the radiations will be directed parallel to the bottom of the dish, thus never reaching either the dish or the pan 19.

In the device herein disclosed, where the adjacent portions of the heater member are connected by webs, radiation from the webs is almost entirely vertical. Radiation from the walls of the troughs will not be in all directions because in the horizontal direction the web is in the way of such radiation and is moreover nearly at the same temperature as the walls. There will be radiation downward which will be reflected by the pan and will therefore, arrive at the surface of the trough portions and of the webs. Since this surface is not bright, it readily absorbs this radiation and the heat radiated into the pan is not therefore, delivered into the room but is conserved and finally reaches the dish.

The bottom of the pan is perforated as indicated at 31 in Fig. 3 but the area of these openings is not sufficient when compared to the area of the pan, to seriously interfere with the reflecting action above described. The openings 31 serve for escape of liquids which may be spilled over the heater and find their way into the pan.

Although I have described one specific form of my device, I do not intend my invention to be limited thereto. Various modifications of the structure herein disclosed will be obvious to those skilled in the art and are within the spirit of my invention, the scope of which is set forth in the accompanying claims.

I claim as my invention:

1. In an electric heating device for operation in air at red heat, a resistance heater comprising a helically wound resistor conductor and a body of homogeneous, thermally-conductive, compressed, electrically-insulating material surrounding said conductor over its entire length and surface and substantially plane sheet metal members formed to enclose said heater and closely contact with said insulating material, said sheet metal members being united to hermetically seal said heater.

2. An electric heating unit adapted to operate at red heat in air and to directly support a cooking utensil resting thereon including in combination, a helically-wound resistor wire arranged in a plurality of spaced convolutions located in a flat plane, a pair of cooperating similarly-grooved thin sheet metal plates located in close face-to-face positions relatively to each other with the resistor wire located within the grooves, a continuous mass of compressed heat-conducting and electric-insulating material entirely surrounding the resistor wire, means securing said plates together at a plurality of contiguous points intermediate the periphery and a welding seam uniting the peripheries of the two plates, said welded points and welding seam operating to strengthen the heating unit and prevent appreciable deformation of any part thereof out of the original plane when operating at red heat.

3. A heating unit as set forth in claim 2 and including terminal members for the resistor wire insulatedly supported by and depending from the lower grooved plate.

4. An electric heating unit operable at red heat in air and adapted to directly support a cooking utensil resting thereon and to heat the same by simultaneously conducted and radiated heat, including in combination, a helically-wound resistor wire arranged in a plurality of spaced convolutions in a flat plane, a pair of cooperating similarly grooved thin sheet metal plates located in face-to-face positions relatively to each other with the resistor wire in the cooperating grooves, a continuous mass of compressed heat-conducting and electric-insulating material within the helix of resistor wire and between it and the walls of the grooves, a plurality of welds between the two plates to resist the expansive thrust of the compressed electric-insulating material and to prevent deformation of the heating unit and a welding seam at the periphery of the plates to hermetically seal the resistor and the mass of electric-insulating material.

5. An electric heating unit adapted to operate at red heat in air and to directly support a cooking utensil resting thereon including in combination, a helically-wound resistor wire arranged in a plurality of spaced convolutions located in a flat plane, a pair of cooperating similarly-grooved thin sheet metal plates located in close face-to-face positions relatively to each other with the resistor wire located within the grooves, a continuous mass of compressed heat-conducting and electric-insulating material entirely surrounding the resistor wire, means securing said plates together at a plurality of contiguous points intermediate the periphery and means for uniting the peripheries of the two plates, said securing and uniting means operating to strengthen the heating unit and prevent appreciable deformation of any part thereof out of the original plane when operating at red heat.

6. An electric heating unit operable at red heat in air and adapted to directly support a cooking utensil resting thereon and to heat the same by simultaneously conducted and radiated heat, including in combination, a helically-wound resistor wire arranged in a plurality of spaced convolutions in a flat plane, a pair of cooperating similarly grooved thin sheet metal plates located in face-to-face positions relative to each other with the resistor wire in the cooperating grooves, a continuous mass of compressed heat-conducting and electric-insulating material within the helix of resistor wire and between it and the walls of the grooves, means for securing the two plates together to resist the expansive thrust of the compressed electric-insulating material and to prevent deformation of the heating unit and means for securing the periphery of the plates together to seal the resistor and the mass of electric-insulating material.

FRANK THORNTON, Jr.